(12) United States Patent
Söderman et al.

(10) Patent No.: US 7,616,791 B2
(45) Date of Patent: Nov. 10, 2009

(54) CONFIDENCE DETERMINATION

(75) Inventors: Tobias Söderman, Bälinge (SE); Mats Inganäs, Uppsala (SE)

(73) Assignee: Gyros Patent AB, Uppsala (SE)

( * ) Notice: Subject to any disclaimer, the term of this patent is extended or adjusted under 35 U.S.C. 154(b) by 173 days.

(21) Appl. No.: 10/555,009

(22) PCT Filed: Jun. 30, 2004

(86) PCT No.: PCT/SE2004/001066

§ 371 (c)(1),
(2), (4) Date: Jan. 19, 2007

(87) PCT Pub. No.: WO2005/001766

PCT Pub. Date: Jan. 6, 2005

(65) Prior Publication Data

US 2007/0118490 A1    May 24, 2007

Related U.S. Application Data

(60) Provisional application No. 60/483,227, filed on Jun. 30, 2003.

(30) Foreign Application Priority Data

Jun. 30, 2003   (SE) ................................. 0301945

(51) Int. Cl.
*G06K 9/00* (2006.01)
(52) U.S. Cl. .................................................. 382/128
(58) Field of Classification Search ......... 382/128–134; 128/922–932; 250/455–465; 356/39–50
See application file for complete search history.

(56) References Cited

U.S. PATENT DOCUMENTS

| 5,005,147 | A | 4/1991 | Krishen et al. |
| 5,835,620 | A | 11/1998 | Kaplan et al. |
| 5,892,577 | A | 4/1999 | Gordon |
| 6,633,659 | B1 * | 10/2003 | Zhou .......................... 382/129 |

(Continued)

FOREIGN PATENT DOCUMENTS

EP    0 583 626 A2    2/1994

(Continued)

OTHER PUBLICATIONS

R. Beale et al., Neural Computing: An Introduction, published 1990, pp. 48-53.

(Continued)

*Primary Examiner*—Bhavesh M Mehta
*Assistant Examiner*—Atiba O Fitzpatrick
(74) *Attorney, Agent, or Firm*—Birch, Stewart, Kolasch & Birch, LLP

(57) ABSTRACT

The present invention relates to a method, a system, a neural network and a computer program product for determining the quality of an analytical process, preferably the confidence value. The analytical process is performed in a microchannel structure of a microfluidic device, from which data information of the analytic process is acquired by scanning at least one search area of the microchannel structure for signal data. The search area comprises the result of the analytical process and the acquired data information is stored as an image, one image for each scanned search area.

35 Claims, 8 Drawing Sheets

U.S. PATENT DOCUMENTS

2001/0026929 A1* 10/2001 Yang et al. .................... 435/23
2001/0036304 A1* 11/2001 Yang et al. ................... 382/132
2003/0018457 A1* 1/2003 Lett et al. ..................... 703/11
2004/0068096 A1* 4/2004 Tsuchihashi et al. ........ 530/350

FOREIGN PATENT DOCUMENTS

| | | |
|---|---|---|
| EP | 0 211 637 A1 | 6/2002 |
| WO | WO-97/01085 A1 | 1/1997 |
| WO | WO-01/46465 A2 | 6/2001 |
| WO | WO-02/075312 A1 | 9/2002 |
| WO | WO-03/056517 A1 | 7/2003 |

OTHER PUBLICATIONS

Rafael C. Gonzalez et al., Digital Image Processing, 1987, ISBN 0-201-11026-1, pp. 90-93, 338-341, 360-363.

* cited by examiner

←Flow direction

←Flow direction

←Flow direction

CONFIDENCE DETERMINATION

TECHNICAL FIELD

The present invention relates to microfluidic systems and a process for determining quality of an analytical process.

In more detail, the present invention also relates a method, a system, a neural network and a computer program product for determining the quality of an analytical process, preferably the confidence value C.

BACKGROUND OF THE INVENTION

The term "microfluidic" refers to a system or device having one or a network of chambers and/or channels, which have micro scale dimensions, e.g., having at least one cross sectional dimension in the range from about 0.1 µm to about 500 µm. The volume handled is in the range of nanolitre, that is less than 5000 ηl, generally less than 1000 ηl. Microfluidic substrates are often fabricated using photolithography, wet chemical etching, injection-molding, embossing, and other techniques similar to those employed in the semiconductor industry. The resulting devices can be used to perform a variety of sophisticated chemical and biological analytical techniques.

Microfluidic analytical systems have a number of advantages over conventional chemical or physical laboratory techniques. For example, microfluidic systems are particularly well adapted for analyzing small sample sizes, typically making use of samples on the order of nanoliters and even picoliters. The channel defining substrates may be produced at relatively low cost, and the channels can be arranged to perform numerous analytical operations, including mixing, dispensing, valving, reactions, detections, electrophoresis, and the like. The analytical capabilities of microfluidic systems are generally enhanced by increasing the number and complexity of network channels, reaction chambers, and the like.

Substantial advances have recently been made in the general areas of flow control and physical interactions between the samples and the supporting analytical structures.

Flow control management may make use of a variety of mechanisms, including the patterned application of voltage, current, or electrical power to the substrate (for example, to induce and/or control electrokinetic flow or electrophoretic separations). Alternatively, fluid flows may be induced by capillarity attraction or mechanically through the application of differential pressure, acoustic energy, or the like. Selective heating, cooling, exposure to light or other radiation, or other inputs may be provided at selected locations distributed about the substrate to promote the desired chemical and/or biological interactions. Similarly, measurements of light or other emissions, electrical/electrochemical signals, and pH may be taken from the substrate to provide analytical results. As work has progressed in each of these areas, the channel size has gradually decreased while the channel network has increased in complexity, significantly enhancing the overall capabilities of microfluidic systems.

The microfluidics technologies/devices are capable of controlling and transferring tiny quantities of liquids to allow biological assays to be integrated and accomplished on a small scale.

Microfluidics is the miniaturization of biological separation and assay techniques to such a degree that multiple "experiments" can be accomplished on a "chip" small enough to fit in the palm of your hand. Tiny quantities of solvent, sample, and reagents are steered through narrow channels on the chip, where they are mixed and analyzed by such techniques as electrophoresis, fluorescence detection, immunoassay, or indeed almost any classical laboratory method.

Today a number of products varying in many respects are available. Laboratory chips may be made from plastic, glass, quartz or even silicon. The fluid may be driven by centrifugal forces, mechanical pressure or vacuum pumps, by inertia, or by one of several electrical methods; fluid flow can be diverted around the chip by mechanical valves, surface tension, voltage gradients, or even electromagnetic forces.

In the technique of using centrifugal forces to drive the fluid a disc that can be spinned is used. Some discs have been of the same physical format as conventional CDs. Samples may be placed in an inner position of the disc and centrifugal forces, created as the disc rotates, push them out through channels cut into the plastic, circumventing the need to design sophisticated electrokinetic or mechanical pumping structures.

As will become evident in the forth-coming description the present invention is in particular applicable to (but not limited to) micro-analysis systems that are based on micro-channels formed in a rotatable, usually plastic, disc, often called a "lab on a chip". Such discs can be used to perform analysis and separation on small quantities of fluids. In order to reduce costs it is desirable that the discs should be not restricted to use with just one type of reagent or fluid but should be able to work with a variety of fluids.

Furthermore it is often desirable during the preparation of samples that the disc permits the user to dispense volumes of any desired combination of fluids or samples without modifying the disc. A microanalysis device for fluids provided in a rotatable disc is described e.g. in WO-0146465.

All analytical procedures are performed with the purpose of generating information that is requested or required for further decisions. In order to be useful, information need to fulfill certain quality goals. Low quality assays require often several replicates in order to generate useful information and is more costly to run for the customer. These may differ very much on the process and the consequence of decisions made on inappropriate information.

BRIEF DESCRIPTION OF THE INVENTION

In the best of worlds analytical processes perform according to how they were designed. Processes may, however, be sensitive to aberrant behavior of the assay that may be caused by variations in sample composition, reagent behavior, wash procedures etc. Knowledge of how aberrant results are generated and their causes may be used to also learn how to identify such errors and create possibilities to approve/disapprove the final result. Thus by evaluating significant characteristics in the data generating process one could tell whether the result appear to have been generated according to standards. Results that appear strange should be flagged for deviating quality.

There are excellent possibilities to extract quality related information in both heterogeneous assays and homogeneous assays using fluorescence radiation as signal generator. In heterogeneous assays, raw data generated from scanning a particle bed are expected to fulfill certain characteristics. Signal intensity should be higher in the top segment of the particle bed, low in the bottom part of the particle bed, and change in a smooth way without discontinuities over the entire bed.

It is therefore possible to foresee certain types of signal profiles that indicate normal or aberrant behavior of the analysis, independent of whether it is due to process, samples or reagents. A few examples of normal or abnormal signal profiles are given in connection with the description of preferred embodiments of the present invention.

It is of special interest for a user of microfluidic system to have a method and an automatic system that makes it possible to establish whether raw data is "normal or not", acceptable or not. This includes describing the distribution of the signal over the particle bed. Aberrations from normal signal distribution could also be classified to assign probable cause of failure. A method is proposed, which generate a quality measure for each individual reaction to obtain reliable results. From a user perspective such information will help to reduce analysis of replicate samples into reliable single samples. Thus the cost for analysis will decrease when quality of the process increase.

Confidence value is a measure of data reliability and an estimation for how close a result is to the expected, perfect result, e.g., an estimation of how close the signal distribution in each column is to the expected. A high confidence value for an analytic process indicates high quality and reliable data result. On the contrary, a low confidence value indicates low quality and that the data from a particular process may not be acceptable depending on one or more disturbances in the process. Disturbances depending on defects and problems that can occur in a process are described in more detail in FIGS. 4-15.

One general object of present invention is to increase the performance of a microfluidic system.

Another object of the present invention is to provide a method, computer program product, neural network and system for evaluating significant characteristics in the data generating process making it possible to analyse whether the result appear to have been generated according to standards.

A more specific object of the present invention is to provide powerful tools for determining quality of a process, especially determining a confidence value of a process, in a microfluidic device and in a microfluidic system.

Moreover, one object of the present invention is to provide excellent possibilities to extract quality related information in both heterogeneous assays and homogeneous assays using fluorescence radiation as signal generator.

Further one object is to provide an automatic method and system for analysing assays, which method and system executes and runs from start the laboratory process, analyzes the result of the process, present the result of the process and analysis, and present at least one quality value, e.g. confidence value, for each assay.

The present invention provides a method for determining at least one confidence value C from an analytical process performed in a microchannel structure of a microfluidic device, from which data information of the analytic process is acquired by scanning at least one search area of the microchannel structure for signal data, said search area comprising the result of the analytical process and said acquired data information is stored as an image, one image for each scanned search area; characterised in that the method comprises the steps of: data processing the acquired data information for determining the confidence value (C).

Variations of the invented method are enclosed in the dependent method claims and the detailed description.

According to one aspect of the invention, at least one characteristic parameter value is determined and/or calculated during the data processing using all or a part of the acquired data information for determining the confidence value (C).

According to another aspect of the invention, at least one characteristic parameter value is determined and/or calculated during the data processing using all or a part of the acquired data information, and said at least one characteristic parameter value is used as input to a classifier for determining the confidence value (C).

According to further one aspect of the invention, at least one characteristic parameter value is determined and/or calculated during the data processing using all or a part of the acquired data information, and said at least one characteristic parameter value is used as input to a classifier for determining the confidence value (C), wherein said classifier is a neural network.

The present invention also provides a system for determining at least one confidence value from an analytical process performed in a microchannel structure of a microfluidic device, from which data information of the analytic process is acquired by scanning at least one search area of the microchannel structure for signal data, said search area comprising the result of the analytical process and said acquired data information is stored as an image, one image for each scanned search area, characterised in that the system further comprises means for data processing the acquired data information for determining the confidence value.

Different embodiments of the invented system are enclosed in the dependent system claims and the detailed description.

Further, the present invention provides a computer program product for determining at least one confidence value from an analytical process performed in a microchannel structure of a microfluidic device, from which data information of the analytic process is acquired by scanning at least one search area of the microchannel structure for signal data, said search area comprising the result of the analytical process and said acquired data information is stored as an image, one image for each scanned search area, characterised in that the computer program product comprises a computer readable storage medium having computer readable and executable program code means embodied therein, the computer readable program code means comprising computer readable program code means for data processing the acquired data information in an image for determining the confidence value.

Different embodiments of the invented computer program product are enclosed in the dependent computer program product claims and the detailed description.

In addition, the present invention provides a neural network for determining at least one confidence value from an analytical process performed in a microchannel structure of a microfluidic device, from which data information of the analytic process is acquired by scanning at least one search area of the microchannel structure for signal data, said search area comprising the result of the analytical process and said acquired data information is stored as an image, one image for each scanned search area, characterised in that the neural network further comprises means for performing each of the steps according to the invented method.

One advantage with the present invention is the automatic generation and presentation of a quality measure for each individual reaction to obtain reliable results. From a user perspective such information will help to reduce analysis of replicate samples into reliable single samples. Thus the cost for analysis will decrease when quality of the process increase.

Further, one advantage of present invention is the increase of the performance of a microfluidic system.

Another advantage is that the present invention provides powerful tools for determining quality of a process, especially determining a confidence value of a process, in a microfluidic device and in a microfluidic system.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
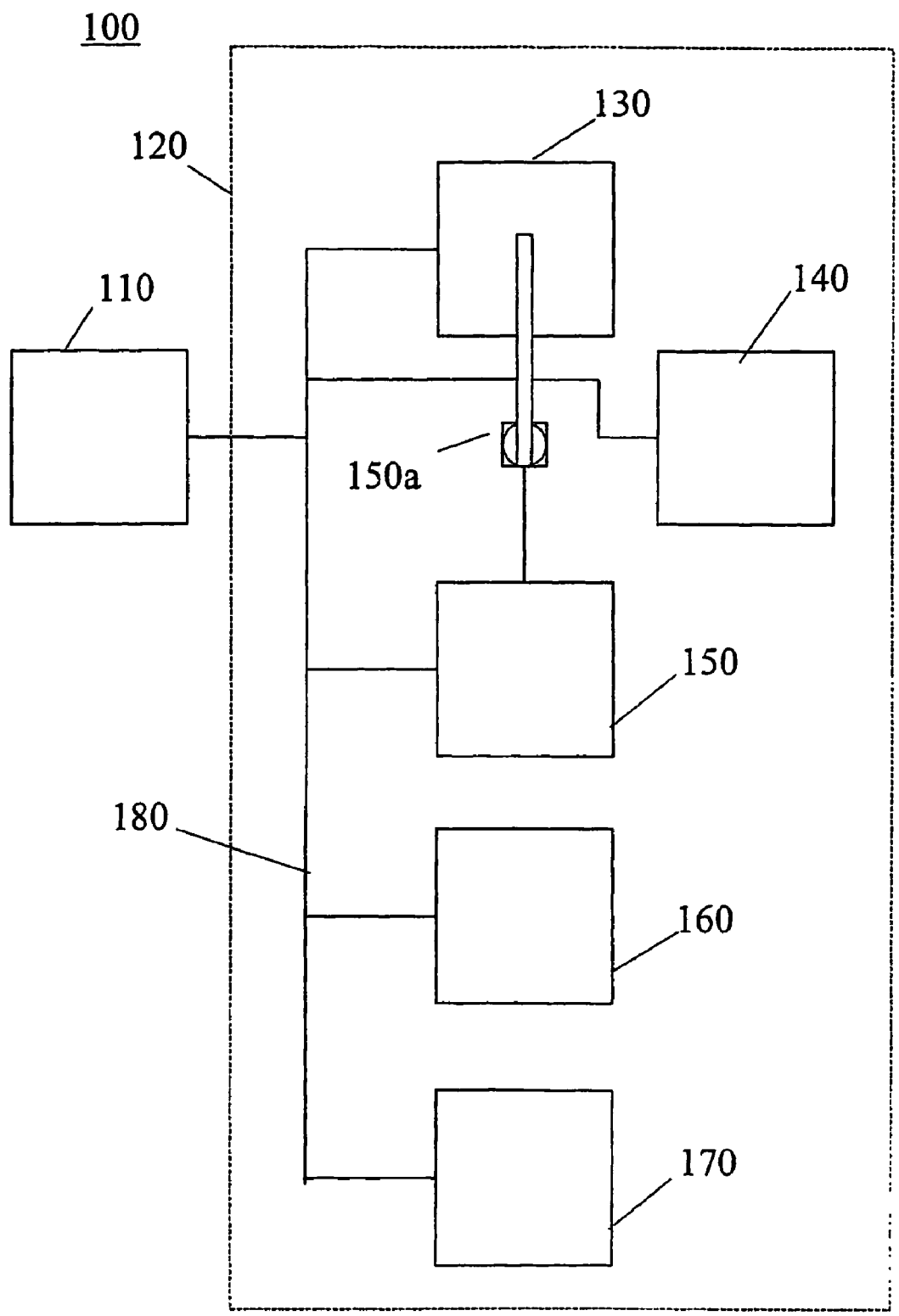
FIG. 1 is a block diagram depicting schematically a system for microfluidic devices.

It is readily apparent to one skilled in the art that various embodiments and modifications can be made to the invention disclosed in this Application without departing from the scope and spirit of the invention.

As used herein, the use of the word "a" or "an" when used in conjunction with the term "comprising" in the sentences and/or the specification may mean "one," but it is also consistent with the meaning of "one or more," "at least one," and "one or more than one." As used herein, the term "rotating" refers to spinning. Yet further, the term "rotating" may also include, but is not limited to a step-wise rotation of a disc.

As used herein, the term "reagent" includes, but is not limited to an analyte.

As used herein, the term "in a circular manner" refers to around the centre of the disc (circumferential direction).

For purposes of describing and claiming the invention, the term "a plurality of microchannel structures" means two, three or more microchannel structures. Typically the term "plurality" means $\geq 10$, such as $\geq 50$ or $\geq 100$ microchannel structures.

The terms "removing noise" and "reducing noise" means that the noise contribution in the measured data values is reduced to zero, or is negligible. The words "reduce" and "remove" will be used alternately in the text, but there is no difference in the meaning of the two words in this specification. They should be regarded as equivalent.

Beside a disc, a microfluidic laboratory system may comprise a control unit and a microfluidic instrument. Such a system is called a Stand Alone System. Each system has its own data and operates completely stand alone. The interaction with the system may be performed at an associated Personal Computer (PC).

Another system can be considered as a group of instruments plus a common persistent storage location, e.g. database. Many instruments can operate on the same set of data (Method Data, Microfluidic Device Data, etc). All interaction with the system needs to be performed at an instrument connected computer. This second system is often called a Distributed Database Solution.

In a third solution, the distributed solution, the system is considered as a group of instruments, a common storage persistent storage location (database), and a number of clients. With this solution the same functionality as in the above-mentioned Distributed Database Solution is reached. In addition there will be a possibility to interact with the system from non instrument connected computers. Examples of additional provided functionality are:

Remote monitoring of instruments.
Perform functions that are not instrument specific (Method Development, Evaluation of processed data, etc.).

With this third solution it is possible to control (Start, Pause, Abort) the processing remotely, that is, from a non instrument connected computer.

An operator/user can control and monitor the performance of the microfluidic instrument from the control unit. The microfluidic instrument comprises of a number of different stations, each station being capable of performing one or a number of defined operations. Different types of microfluidic instruments consist of different kinds of stations or number of stations. Therefore, some operations will not be provided for or applicable on a certain type of microfluidic instrument.

The operations are initiated from the control unit.

FIG. 1 is a block diagram depicting schematically a microfluidic system 100 that includes a control unit 110 and an instrument 120 comprising a sample and reagent station 130, a wash station 140, a liquid transfer station 150, at least one station 160 for implementing transport of liquid within the microfluidic device e.g., a spinner station and a detector station 170.

The control unit 110 may be one or more computers outside the instrument and/or one or more central processors within the instrument, a specialised computer, server, Personal Computer, Digital Processor, Central Processing Unit, etc. The control unit is connected to the instrument 120 and its different stations via a conductor or data bus 180 and operation orders are transmitted either as electrical or optical signals or included in a suitable predetermined protocol to hardware circuits distributed between the stations.

The sample and reagent station 130 comprises means for storing samples, reagents or other liquids. Said samples, reagents or other liquids are stored in some kind of container, such as a micro plate or multiwell plate, a test tube rack or a test tube. Said plate may be designed as a matrix of small containers or wells. Said plate can have different sizes depending on the number of wells. The container may be loosely fixed at a container holder, for instance a so called carousel, which is a circular revolving plate.

The liquid transfer station 150 has a robot 150a that transfers at least one sample or any other predetermined liquid aliquot at a time from the sample and reagent station 130 to a microfluidic device, for instance in the form of a disc that can be spinned. The station may have means for transfer of liquid samples, and other liquids, for instance a number of injection needles connected to syringe pumps or a number of solid pins may be used for the transfer of samples. Said needles and pins may be configured in different numbers of rows and columns having different distance between the tips in both directions. Another alternative is the microdispensor described in WO-9701085.

Said needles and pins may or may not be washed in a wash solution between the transfers of samples and reagents. Washing is done by means placed in a wash station 140.

The liquids dispensed to a microfluidic device are transported within the device by means associated with the station 160 for implementing liquid transport. This station may be a spinner station in case the microfluidic device is adapted to permit liquid transport caused by spinning. The result of a process carried out within the microfluidic device is determined by means for detecting (a detector) which is located in a detector station 170.

Figure 2:
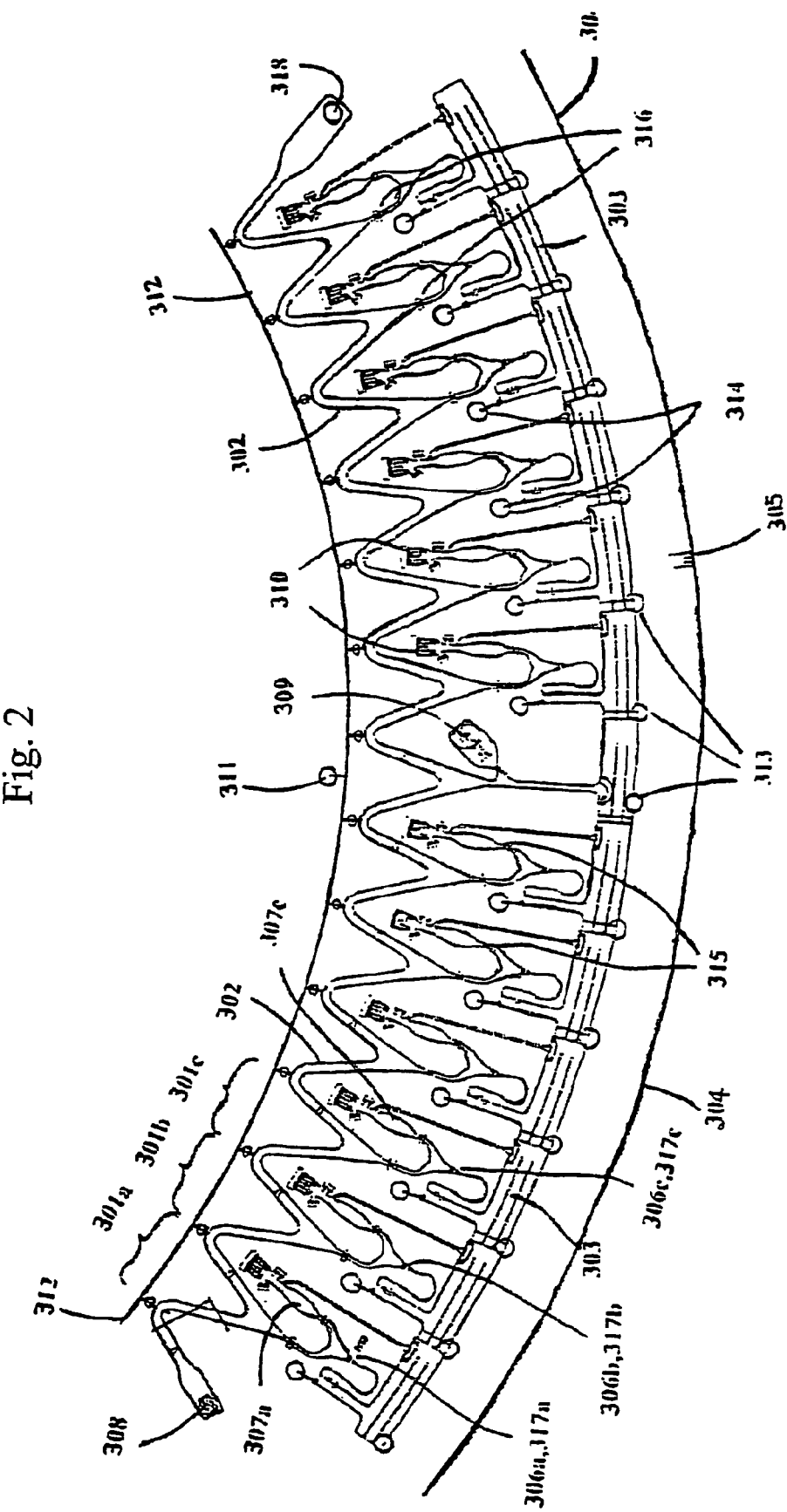
FIG. 2 shows an embodiment of a microfluidic device.

One design of microchannel structures (301a,b,c, etc.) that are adapted to a circular disc is illustrated in FIG. 2. The structures are linked together by a common distribution channel (302) and a common waste channel (303). The orientation of the microchannel structures around a common axis of symmetry is apparent. The circumference (304) of the disc has a home position mark (305). Each of the combined reaction/detection microcavities, even called microchambers, (306a,b,c, etc.) is communicating in the downstream direction with the common waste channel (303) and in the upstream direction via separate connections with the common distribution channel (302) and separate volume measuring units (307a,b,c, etc.). A detection area (317a,b,c, etc.) is associated with each detection microcavity. The common distribution channel (302) carries at one of its ends and at an intermediary position inlet ports (308 and 309, respectively). Another kind of inlet port (310) is located at each volume measuring unit (307a,b,c, etc.). Each microchannel structure (301a,b,c, etc.) also has an outlet to the common waste channel (303) and an outlet port (318) at the remaining end of the common distribution channel (302). An inlet vent (311) to ambient atmosphere is connected to the common distribution channel via a common venting channel (312). Other vents (313 and 314) to ambient atmosphere are placed in the common waste channel (303) and in the connecting microconduit between each reaction/detection microcavity (306a,b,c, etc.) and the common waste channel (303). Appropriate valvings are positioned at 315 and 316 in each microchannel structure (301a,b,c, etc.).

As shown in FIG. 1, each of said stations is connected to the control unit 110 and controlled and monitored from the control unit 110 by means of a number of operations. A software operation is defined as a logical group of hardware instructions, which are performed to accomplish a certain function, such as:

Implementing transport of liquid, for instance spinning the device if the device is in the form of a disc that can be spinned in order to induce liquid flow.

Sample transfer to a specific common distribution channel or a specific microstructure.

Reagent transfer to a specific common distribution channel or a specific microstructure.

Position the microfluidic device.

Incubate the liquids at a certain position in the microstructures for a specific time.

Detection, i.e. detection of the results of the method carried out in the microfluidic device.

An operation may consist of a number of steps. A step is a non-dividable instruction, such as a ramp in a spin operation. A set can be constituted by putting together a number of these operations in a desired order. Such a set is defined as a method and controls all parts conducted within the instrument. It prescribes a type of microfluidic device and defines a set of actions, operations. It may prescribe halting for conducting steps outside the instrument, for instance incubations at constant temperature when the method concerns cell culturing.

As described above, the control unit is capable of starting, running, controlling and stopping various processes comprising sample preparation, treatment of liquids, various chemical and biochemical steps etc in a microfluidic device. Further, the control unit is capable of starting, running, controlling and stopping the scanning of the microfluidic device and detection for analytic result, the conversion of the detected result to digital data information and the storage of the data information in a data storage device.

The operation of the microfluidic laboratory system for performing analytic processes in microchannel structure of a microfluidic device, may comprise following steps:

running the analytic process;

acquiring data information of the analytic process by scanning at least one search area of the microchannel structure for signal data, said search area comprising the result of the analytic process; and storing said acquired data information as an image containing multiple dimensions, one image for each scanned search area.

Creating and Processing a Substance Raw Data Image.

An algorithm, or rather an automated method, for that is detectable by use of a particle bed is presented hereinafter. This algorithm may be started for each scanned search area/detection area/particle bed of interest.

The invention will now be further detailed with respect to a particular example comprising a microfluidic device (see FIG. 2) in a disc format, comparable to Compact Disc (CD), having an axis of symmetry perpendicular to the disc plane and with a radial flow direction from the axis of symmetry for each of the detection microcavities that comprises a bed of particles. This kind of microfluidic device will henceforth be called CD. The signal detected and measured may be fluorescence from an antibody fluorochrom conjugate (antibody-fluorochrom). Each bed defines a detection area in the surface of the disc. See for instance WO-02075312 (Gyros AB). The detection area is part of a search area comprising also a defined minor zone around the detection area. The principles outlined in this example may be adapted also to other devices. The principles are also applicable to other kinds of radiation as discussed elsewhere in this text.

Generation of a Substance Raw Data Image

A control unit is programmed to control the scanning and detection.

Each search area is scanned by a detector head that is capable of detecting a detectable physical feature deriving from a substance present in the microcavity, like radiation caused by radioactivity, fluorescence, chemiluminescence, bioluminescence, enzymatic activity, scattering of light, absorption of light, reflection of light etc. The measured data are stored in a data storage, an image data storage, connected to or connectable to a processing unit, which may either be comprised in the controller means, or as in another possible embodiment, incorporated in a separate computer system. Each search area is identified by an identifier, which may be used as address. The identifier makes it possible for the system and controller means to locate each single search area and its detection area on a CD and link the corresponding stored measured data in the image storage.

Figure 3A:
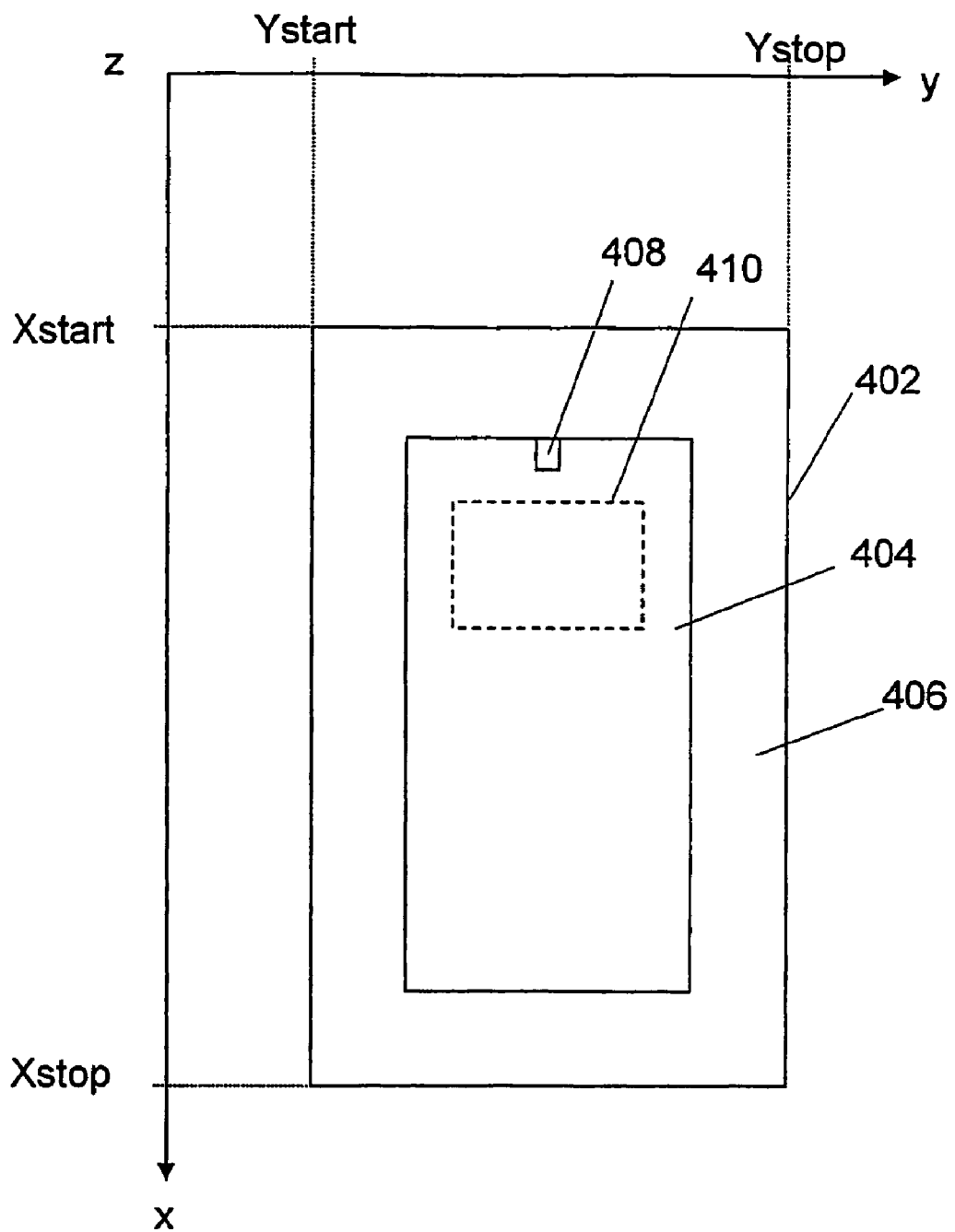
FIGS. 3A and 3B are schematic illustrations of search areas.
Figure 3B:
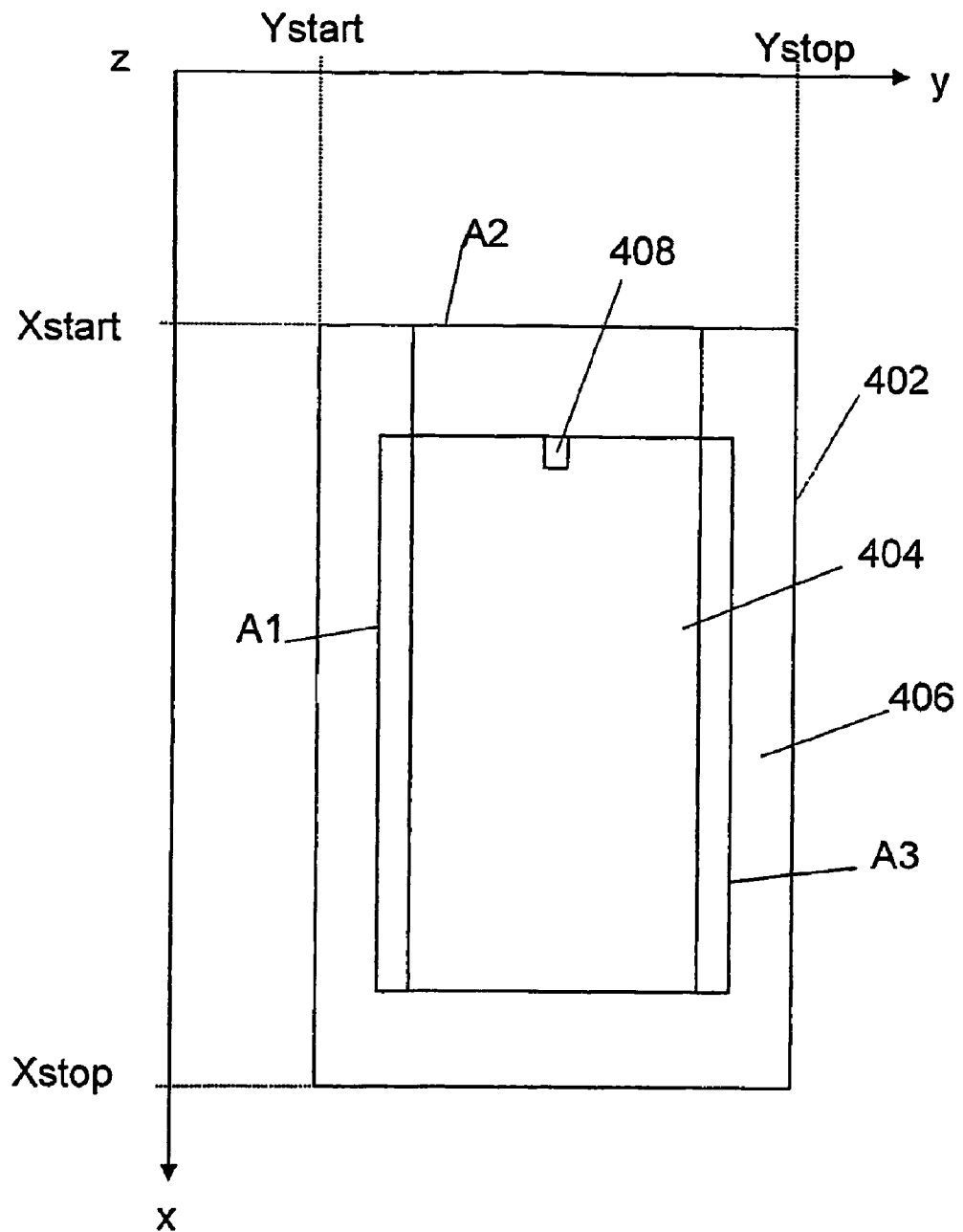

Now with reference to FIGS. 3A and 3B, each search area 402 has a pre-defined radial start position, Xstart, a pre-defined angular start position, Ystart, a pre-defined angular stop position, Ystop, and a pre-defined radial stop position, Xstop. The start of the collecting of data is started at a position, primarily an angular and/or a radial position that is prior to an intended detection area, and to end the collecting at a position that is after the same detection area. The search area will therefore cover an outer area 406 surrounding the detection area 404. The search area 402 is scanned in radial direction by the detector disc lap by disc lap. The radial start position Xstart is the number of disc laps/revolutions, counted from a spinning start position, Spinstart (not shown). When the scanning of a search area starts, and the radial stop position is the number of laps, counted from the spinning start position, when the last angular scanning of the search area is to be performed. The scanning of the search area in the angular direction starts during the lap, which is defined by the radial start position, at the angular start position in the angular direction, which is defined by the spinning direction of the disc and the detector position in relation to a Home Mark on the CD. The scanning in angular direction is stopped at the angular stop position.

FIG. 3A is schematic in the sense that the search area of a rotatable device typically is a) slightly narrowing when going from an outer position inwards towards the centre of the CD, and b) slightly arc-shaped. Compare for instance that the Ystart position for each lap are always at the same angular position (which also applies to the Ystop position).

During a lap, from the angular start position to the angular stop position, a stream of collected data from that search area will generate a corresponding stream of measured data that are stored into the storage. This is repeated lap by lap from the radial start value to the radial stop value. The processing unit of the controller 120 links measured data to the correct identified detection area, and there will be no mixing of measured data from different search and/or detection areas. Each scanned search area has a corresponding set of collected measured data. The processing unit will organize the data in such an order, position by position in each set of measured data, and it is therefore possible for the image processor to locate a certain measured value in the set. The set of measured data has therefore similarities to an electronic and/or digitally stored image. An image is defined in very small elements, called pixels. Each pixel corresponds to a position of a measurement area in the search area.

When the scanning, detecting and storing are finished, the measured data of a search area is possible to plot by use of printer/plotter software program used by the processing unit in a three dimensional diagram, wherein the horizontal plane is defined by the two dimensions x and y, in this case the radial direction, x-axis, and the angular direction, y-axis, which is perpendicular to the x-axis. Positive x-direction is defined as the main flow direction (downstream) through the detection area, from the inlet 408 of the detection area 404 to the outlet of the same. Positive y-direction is defined as the scanning direction which is orthogonal/perpendicular to the radius (or flow direction). The third dimension, z-axis, perpendicular to the horizontal plane defined by the x- and y-axis, is the magnitude of the measured value, e.g. measured value of the fluorescence intensity. The measured data defines a surface of measured data, having peaks and valleys. As mentioned above, the three dimensional figure has essential similarities with an image having an intensity value defined for each pixel, and the surface of measured data is therefore called an image of a search area/detection area/particle bed comprising the substance from which the measured signal derives. In the description of this application, an image is the stored detector measurement data belonging to a search area/detection area/particle bed. A pixel is here defined as a discrete measurement area within the search area/detection area and each pixel may have a measured intensity value, a pixel value. The resolution of the image is depending of the number of discrete measurement points in the y-direction and the number of laps in the x-direction within the search area. The resolution increases with increasing density of measure points and scanning laps, and consequently, the area of a pixel will decrease. If the electromagnetic-emitting source is a laser, the possible minimum pixel area is limited by the minimum cross-section of the laser beam with the search area.

During the scanning of the search areas the pixel intensities are determined by the detection process and stored as digital pixel data representing raw data images of the search areas.

The space between the surface of measured data for the search area/detection area and the base plane, defined by the two axes in the base plane, constitutes a volume. The whole or a part of the volume may represent a wanted measure for a chemical process, i.e. a reaction variable. This value is possible to calculate by using a mathematical method, e.g. addition or integration of measurement data over the whole area of the detection area, or one sub-area 410, even called integration area, (FIG. 3A) or a number of sub-areas of the detection area. Sometimes the object is to calculate an amount for a subarea, here called a normalized area, i.e. a predefined amount of pixels, inside the detection area. This is done to minimize the variance between detected structures. The variance depends among other things on background radiation, such as fluorescence, from the detection area.

FIG. 3B is in detail similar to FIG. 3A, the only difference is that FIG. 3B illustrates the position of the sub-areas A1, A2 and A3, which is used in some calculations, which is described further down in this description.

In an ideal image of a detection surface, the area is smooth, because of the absence of noisy background contribution in the measured raw data signals from the detector. This image includes only measured data from a substance signals, i.e. the substance contribution to the detected and measured raw data signal. In reality, a substance raw data image comprises measured substance data and noise data. The noise cause irregularities, like noise peaks, in the surface, and evidently, a calculation of the volume in an area having one or many noise peaks will not result in a true measure for a chemical process.

It is therefore sometimes necessary to reduce the noise contribution in a substance raw data image as much as possible before calculation of the measure.

A method for removing noise from substance raw data information in substance raw data images is earlier known from WO-03056517. Each image is associated to one detection microcavity, even called detection microchambre, and one substance that is present in the detection microcavity of a microfluidic structure of a microfluidic device. The substance raw data information is obtained by use of a detector arrangement capable of scanning a search area associated to a detection area, which is associated to the detection microcavity. The detector arrangement is capable of detecting at least one of a number of detectable physical features discussed above, e.g. fluorescence, luminescence, etc. emitting radiation from the search area, and generate output that is proportional to the magnitude of detectable activity. The output is converted to measure data storable as substance raw data in a set in a data storage. The method may comprise following steps in any order for removing different noise signals contributions step-by-step in any order in a substance raw data image:

reducing background radiation (step $\alpha$);
reducing peak disturbance (step $\beta$);
locating the detection area within the search area (step $\chi$);
removing binary artefacts (step $\delta$);
removing unwanted areas of the detection area (step $\epsilon$);
applying default detection area in noisy images (step $\phi$).

Each of the steps $\alpha$-$\phi$ comprises a number of sub-steps. Steps $\alpha$-$\phi$ may be regarded as an algorithm, but is not necessary that all of the steps $\alpha$-$\phi$ are carried out for all images. The order and kind of steps is typically pre-selected and depends among others of the sensitivity and accuracy required in each individual step. In general, inclusion of more steps is required when high sensitivity is desired.

A background processed image is the result of step $\alpha$, which now will be presented in more detail.

Step $\alpha$: Reducing Background Radiation and Construction of Background Processed Images.

The object is to remove the electronic, optical and dust noise that may be visible in the image. The method mainly comprises two variants.

In the first variant, a background radiation image is used. Following steps may be used:

if available, accessing a background radiation image or, if not available, generating a background radiation image (step α'1);

if available, accessing corresponding substance raw data image or, if not available, generating substance raw data image (step α'2);

correlating the two images and generating a correlation image (step α'3);

locate the positions of the largest pixel values (step α'4);

positioning the images correctly, subtracting corresponding pixel values and storing the generated background processed image (step α'5).

This first variant is now discussed in more detail.

In the first variant, the first step, step α'1, is to scan the disc and measure the radiation, e.g. the intensity of the fluorescence, without presence of the substance giving raise to the measured signal from the detection areas, e.g. before step b) in the method for determining the amount of a substance, retaining the radiation associated substance before the detection areas/particle beds of the disc have been treated, e.g. with antibody-fluorochrom. All search areas/detection areas are scanned and each of the corresponding sets of measured data is stored in a background radiation image. When using antibody-fluorochrom, the corresponding image is called background fluorescence image. The image contains the measured data of the background radiation noise signal and other noise signals. In preferred variants the scanning for the background radiation image is carried out as close as possibly to the step in which the substance causing the radiation is formed and/or retained in the detection microcavities. Although not preferred, the manufacturer may provide a background radiation image that for instance may be based on the average of many CDs of the same kind.

The second step, step α'2, is in this first variant the same as step c) in the method for determining the amount of a substance, above. The substance is now present in the detection microcavities, for instance retained in particle beds that may have been washed, e.g. after the particle beds have been treated with e.g. antibody-fluorochrom. This image is the substance raw data image, described above.

If the background radiation images and corresponding substance raw data images exist already and are availably stored, there is consequently only to access (e.g. by copying or reading) the images in step α'1 and step α'2 instead of generating them again by the scanning and detecting processes.

The two images should be detected under the same conditions, e.g., same laser power and same detector sensitivity if the detection principles are based on fluorescence.

The third step of the first variant, step α'3, is to correlate the two images in two dimensions, that define a correlation image, by use of a two-dimensional correlation. The use of two-dimensional correlation is well-known in the art of signal-processing. Thus, the step has resulted in a correlation image.

In the fourth step, step α'4, of the variant, the position of the pixel, or pixels, having the largest intensity value in the correlation image is/are located. This could be done by using a simple comparison algorithm, wherein the recently largest value is stored and compared with the next data, e.g., intensity value, that hasn't been compared with any of the earlier pixel data. The positions of the pixels having the largest pixel values, largest intensity values, are stored and used in the next step, step α'5.

In step α'5, the background radiation image is moved to the correct position of the correlation image by using the identified pixel positions. The parts of the image that overlap is subtracted pixel by pixel.

These five steps have resulted in a new image, the background processed image.

The substance raw data image comprises the wanted substance radiation data. If not any new noise have been introduced by the introduction of the substance giving rise to the measured signal into the microcavities (part of step b), the process of noise removing may be stopped.

In the second variant is a Median value of the background radiation data used. Following steps may be used:

accessing or generating a substance raw data image (step α"1);

determining a Median value for background radiation data (step α"2);

subtracting pixel values of substance raw data image with the median value, and store background processed image (step α"3).

The second variant of reducing background radiation and construction of background processed images will now be described in more detail.

This second variant for removing background radiation, like fluorescence, especially for removing electronic and optical noise that exists in the search area outside the detection area, is possible to use instead of the five steps described above. This alternative variant works very well under the condition that there is no unwanted object of large size outside the detection area and the background signal intensity is constant inside the image. This variant has the advantage that the disc is scanned only once, which is described hereinafter.

The first step, step α"1 in this alternative variant, should start after the radiation associated substance has been incorporated into the detection microcavities. In the method for determining the amount of a substance above this for instance corresponds to after the detection areas have been treated with the antibody-fluorochrom, i.e. in step c. As described above, during the scanning of the search areas for the radiation, the pixel values of the substance raw data images are detected and determined, and stored as digital pixel data. If the substance raw data images exist already and are availably stored, there is consequently only to copy/read the images, instead of generating them again by scanning and detecting processes.

In the second step, step α"2, a median value of the pixel values for at least a portion of the search area outside the detection area is calculated and used as background radiation value, e.g. as a value for the background fluorescence. The median value is an estimated value for the background radiation (intensity).

In step α"3, the substance raw data is decreased with the median value contribution, e.g. by subtraction, pixel by pixel, until all pixels are processed and a background processed image is provided.

Potentially the step for determining Median value may be replaced by determining some other form of an average value and use this value instead of the Median in the subsequent steps.

Both methods, α' and α", provide a background processed image for each scanned search area, i.e. an image with reduced background radiation, such as fluorescence, and can be used separately or in combination in other steps of the innovative method, with the former being preferred at the moment.

Step β: Reducing Peak Disturbances.

The method may comprise one or more steps in which peak disturbances originating from dust, chemistry and other artefacts are reduced, e.g. reducing peaks from fibres. The disturbance peaks have typically a relatively high amplitude and a relatively narrow distribution. However, the image of an ideal detection area is smooth and does not contain any disturbance peaks.

Following steps may be used:
Generating a Laplacian processed image from the earlier stored image, typically a background processed image, by using a Laplacian filter in two dimensions (step β1);
Calculating a disturbance threshold value from the image created in the previous step, typically from a background processed image (step β2);
Generating binary encoding Laplacian processed image by applying the disturbance threshold limit to the image used for calculating the threshold value (step β3);
Finding the start points in clusters (step β4);
Determining a minimum rectangular area surrounding the start points (step β5);
Calculating an interpolated value within each peak area and substituting the original data of the peaks, and storing the disturbance filtered image (step β6).

The process for reducing peak disturbances will now be described in more detail.

Thus in a first step, step β1, a radiation intensity image, for instance a background processed image as discussed above, may be processed by a Laplacian filter in two dimensions. This is a standard method earlier made known in the relevant art. The result of this step is that peaks in a background processed image are amplified. The result is normalized with the maximum radiation (intensity) in the background image. This step provides a Laplacian processed image.

In a second step, step β2, a disturbance threshold limit is calculated by use of the standard statistic functions average and standard deviation of the stochastic background noise, calculated from the image used in step β1. This step enhances the disturbance peaks of the image.

In the third step, step β3, the Laplacian processed image is binary encoded. In the encoding process pixel intensities/values equal to or higher than a threshold limit are set to one of the two corresponding binary values, for instance "1" or "positive" and pixel intensities less than the disturbance threshold limit are set to the other of the binary values, for instance "0" or "negative". The determined disturbance threshold limit determined in step β2 may be used in step β3 for encoding. This step creates an image wherein the high intensity pixels of the peaks appears as groups, even called clusters.

In a fourth step, step β4, the Laplacian processed image may then be processed for finding the pixel in each peak having the largest value by using the position information from the clusters in the binary Laplacian processed image. Each pixel having the largest value in a cluster is defined to be a center and start point. The other pixels of the clusters are set low in the binary Laplacian processed image. This step results in a cluster image.

In a fifth step, step β5, the start points defined in the cluster image is used for determining a minimum rectangular area by iterative testing using different area sizes. The iteration, that works on the Laplacian processed image, is stopped when a minimum rectangular area contains only pixels having a negative intensity value or zero value according to the definition in previous steps and as a result of the earlier performed Laplacian filtering. These pixels surround the corresponding start point and define the position, the area of the corresponding disturbance peak and the border pixels which is outside the peak area.

In a sixth step, step β6, the disturbance peaks of the background processed image are removed by substituting the original data within each peak area with an interpolated value between the border pixels of the corresponding peak. The interpolated values are calculated by use of an appropriate interpolation function, both a linear and a non-linear function is a possible choice.

The process has now generated a "disturbance filtered image" of the radiation intensity, e.g. fluorescence intensity, of the detection area.

Step χ: Determining a Global Threshold Value

The object is to make a radiation intensity image, such as a disturbance filtered image, binary by determining a global threshold that separates the measured substance signals, i.e. the signals from the substance in the detection area, from the background signals. For instance, the detection area pixels should be equal to binary high, like "1", and the rest of the image equal to binary low, like "0".

The purpose of the following steps is to determine a valid global threshold value. This is done by an iteration that tests different threshold values. A global threshold is valid when only a few pixels in a part of the search area that is not connected to the detection area have an intensity higher than the pixels in the detection area.

Following steps may be used:
Generating a y-summation graph (step χ1);
Median filtering of the y-summation graph (step χ2);
Determining centre position of detection area (step χ3);
Determining radial directed edges of detection area (step χ4);
Generating a x-summation graph (step χ5);
Median filtering of the x-summation graph (step χ6);
Determining an edge curve (correlation) (step χ7);
Restraining disturbance peaks in the edge curve (step χ8);
Determining the start and end positions of the detection area (step χ9);
Determining a start value of the global threshold value (step χ10);
Adjusting the global threshold value to the value giving correct detection area width (step χ11);
Generating a binary encoded disturbance filtered image by use of the global threshold value (step χ12).

This process will now be described in more detail.

In a first step, step χ1, pixel values are summarized in the radius direction, pixel values, line by line, in a radiation intensity image, typically the disturbance filtered image, to get a one-dimensional y-summation graph in the y-direction of the radiation intensity, e.g. fluorescence intensity (angular direction on a spinning disc). Each y-coordinate on the graph will be the sum of the pixel values in radial direction having the same y-coordinate.

In a second step, step χ2, the y-summation graph is filtered to remove disturbing peaks, e.g. with a median filter function.

In a third step, step χ3, the centre of the detection area in y-direction (angular direction on a spinning disc) is calculated and located by use of a correlation, and with the filtered y-summation graph and the known detection area width as input value to the correlation length. This should normally give a graph with one large peak.

In a fourth step, step χ4, the centre of the largest peak is set to the centre of the detection area. It's now possible to calculate the positions and the radial extension of the particle bed edges by use of the known data for the centre and detection area/particle bed width. Hereby, the radial directed border/edge pixels are known.

In a fifth step, step χ5, the radiation intensities are summarized in the image in y-direction (angular direction on a spinning disc) using the limits (borders) determined in the previous step to get an x-summation graph (radial summation graph) in x-direction (radius direction) of the radiation intensities. The summation of pixel values is performed in the same way, but in the orthogonal direction in the same plane, as in step $\chi1$.

In the next step, step $\chi6$, the x-summation graph is filtered with a median filter function to remove disturbing peaks.

In the seventh step, step $\chi7$, the start of the detection area in the x-direction is determined by use of correlation between a step function and the filtered x-summation graph. The mathematical process results in an edge curve, see FIG. 9.

In step $\chi8$, disturbance peaks, close to edge that is sitting opposite to the inlet, are restrained by multiplying the edge curve with a ramp function.

The purpose of step $\chi9$, is to find the start position of the detection area by finding the highest positive peak centre in the filtered edge curve (from step $\chi8$) and using a minimum detection area length to calculate the end position of the detection area.

An approximate position of the detection area edges, border pixel is now known.

In the tenth step, step $\chi10$, the global threshold value is now determined by use of an optimal threshold technique for image processing known in the relevant art. It is assumed that the background and particle bed peaks are normal distributed with the same variance. Calculate from the disturbance filtered image the estimated background intensity as max of (median background intensity on the areas A1+A3 or median intensity background on the area A2)). The positions and orientations of the areas A1, A2 and A3 are illustrated in FIG. 3B. Calculate the estimated substance intensity as median of the detection area. Calculate the start value for the iteration step as average of the estimated background intensity and the estimated substance intensity.

In step $\chi11$, the global threshold value is iterative adjusted, between a maximum intensity value, defined by the estimated substance intensity, and a min value, defined by the estimated background intensity, so that the average number of pixels in the y-direction (the angular direction) inside the approximate position of the detection area is equal to the detection area width.

In step $\chi12$, the calculated global threshold value is used for binary encoding a stored image, in particular the stored disturbance filtered image into a binary coded disturbance filtered image.

Step $\delta$: Remove Binary Objects Outside the Detection Area

The object of the following steps $\delta1$-$\delta2$, is to remove any disturbances outside the detection area. The following algorithm processes the data of the binary coded disturbance filtered image, in which all objects are set to 1, i.e. binary high. Further, it is assumed that there is no object to be removed inside the borders of the approximately calculated detection area position, and the detection area is the largest area of the image.

The first step, step $\delta1$: labelling of all the objects in the binary coded disturbance filtered image, wherein the number of connected pixels, i.e. the area, of each object is determined. Labelling is a known method in image processing.

The second step, step $\delta2$: generating a binary detection area image by removing all but the largest objects that are inside the approximate detection area position.

Step $\epsilon$: Removing Unwanted Areas of the Detection Area

Sometimes the object is to calculate an amount for a "normalized" area, i.e. a predefined amount of pixels, inside the detection area. This is done to minimize the variance between detection areas on the same microfluidic device. The variance depends among other things on background radiation, such as fluorescence, from the detection area. It is assumed that the 3D distribution of an intensity signal inside the detection area is independent of small variations in the detection area length. The substance signal deriving from a portion of the detection area that may be closest to the inlet of the corresponding detection microcavity. The algorithm used is a process for generating a new binary image that only comprises pixels within the normalized area ((detection area width) multiplied by (min detection area length)) in the binary detection area image starting from the inner part of the CD.

The first step, step $\epsilon1$: generating a normalized area image by setting all binary high indicated pixels outside the location of the normalized area ((detection area width) multiplied by (min detection area length)) to binary "low" in the binary detection area image.

The second step, step $\epsilon2$: multiplying each corresponding pixel in the disturbance filtered image, generated and stored earlier in the invented process, and the normalized area image with each other and perform a calculation, e.g. integration, on the normalized area.

Step $\phi$: Apply Default Detection Area in Noisy Images

The described method above will not work properly, or not at all, for very noisy images hiding the substance signal. The following algorithm works, if all processed images originate from the same set of detection areas, e.g. the same CD. The detection areas are then well-defined in angular position and quite well in radius direction.

During the algorithm to locate the position of the detection area within the search area, all positions for detection areas having high confidence are stored.

The method for applying default detection area in noisy images may comprise following steps:

Step $\phi1$: Saving automatically all determined detection area positions (step $\chi$) fulfilling high confidence criterion.

Step $\phi2$: Calculating an average detection area position.

Step $\phi3$: Using automatically the average detection area position if one or more predetermined condition is fulfilled.

The average position for a detection area will automatically be applied for all calculated detection areas that fulfil all following conditions:

Its angular start position differ from the average start position more than a particular amount multiplied by the detection area width, wherein the amount is chosen within the range of 0-1.

The average number of binary high pixels, in the normalized area image, in angular direction for all radiuses is less than a particular amount multiplied by the detection area width, wherein the amount is chosen within the range of 0-1.

The difference between angular stop and start positions is greater than an amount multiplied by the detection area width, wherein the amount is chosen 1-10.

The number of binary high pixels, in the normalized area image, in angular direction for all radiuses is less than a particular amount multiplied by the detection area width multiplied by a minimum detection area length, wherein the amount is chosen within the range of 0-1.

Analysing the Image Data

The present invention relates to a method for determining a confidence value from an analytic process performed in a microchannel structure of a microfluidic device, from which data information of the analytic process is acquired by scanning at least one search area of the microchannel structure for signal data, said search area comprising the result of the analytical process and said acquired data information is stored as an image, one image for each scanned search area. Each image is formed by the pixel location/address in a plane (two dimensions) of the search area and at least one detected/ measured measure value, e.g. the fluorescent intensity, for that pixel location provided by the scanning operation. The different steps α-φ for removing noise from substance raw data information in substance raw data images may be used, all together or only selected steps, for producing a noise reduced image.

As described above, a number of different images are prepared during the steps α-φ in the removing noise method. Each one of these images, including the scanned raw data image, may be used in the following described processes for determining a confidence value.

The method comprises the steps of data processing the acquired data information for determining at least one confidence value. In one embodiment of the invention, said at least determined confidence value may be presented for each image on an output device, such as a screen, cathode ray tube (CRT) display, liquid crystal display (LCD) or other display device, or a printer, etc.

When determining the confidence value according to different embodiments of the present invention, data information of the entire stored image or parts of the stored image may be used.

In one embodiment of the invention, the confidence value is determined by means of the signal data distribution in an image.

Different Algorithm Examples for Determining Confidence Value

The confidence value, hereinafter denoted with letter C, is determined by calculation using the image content, that is the data information, for example the intensity signal distribution of the image, or an analyse of the image content, or a combination of analyse and calculation. C is a variable that varies from image to image, from assay to assay, etc.

In the following, three different methods of calculating the confidence value are described.

In all examples, the confidence value C is initially set to 1. The confidence value range is 0-1.

Example 1

Electronically Saturated Signal

1. Find (the number of pixels) number of saturated pixels, $N_{ps}$, in the background processed image (described above) that are higher than 99.5% of the maximum possible intensity.
2. Determine the normalised number of saturated pixels, $N_{psN}$, by dividing the numbers of saturated pixels, $N_{ps}$, is with the image size $A_I$, $N_{psN}=N_{ps}/A_I.$ 3. Modify the confidence value according to confidence value $C_{Mod1}=C*(\sqrt{N_{psN}})$.

Figure 9:
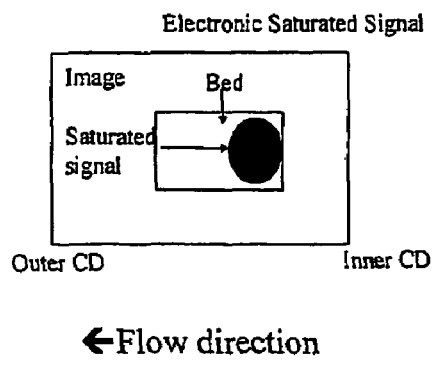

The C of this algorithm, $C_{Mod1}$, indicates how much the data of a stored image depends on a problem or defect defined as electronically saturated signal (see FIG. 9).

Example 2

Noise Peaks

1. Calculate the start points for noise peaks by using the steps of algorithm β (see especially step β4), as mentioned above.
2. Determine an array of noise peak intensity, here called a noise peak intensity array, by calculating the intensity from the background processed image (defined above) for each noise peak position and determine the maximum intensity, $I_{MAX}$, in the background processed image, and select a predefined maximum number, $n_d$ (default set to 10), of the worst disturbances, in this case the highest noise peaks, for the array.
3. Calculate the noise peak intensity, $SI_P$, as the sum of all noise peak intensities, $I_P$(noise peak start point pixel), added together and divided by the maximum intensity, $I_{MAX}$, in the background processed image, $SI_P=\Sigma(I_P\text{(noise peak start point pixel)}/I_{MAX}).$ 4. Calculate the noise peak normalized intensity, $SI_{PN}$, by dividing the noise peak intensity, $SI_P$, with a predefined maximum number of allowed disturbances, $n_d$, default set to 10, $SI_{PN}=SI_P/n_d$ (The algorithm does not consider more than maximum number of allowed disturbances.)
5. Modify C according to the formula, $C_{Mod2}=C*(1-0.5*SI_{PN}).$ (For example, if there are 10 noise peaks that have the highest intensity in the image the confidence is halved.)
   The C of this algorithm, $C_{Mod2}$, indicates how much the data of a stored image depends on a problem or defect defined as noise peaks (see FIG. 7).

Example 3

Random Noise

1. Set constant background noise intensity, $I_{BC}$, as maximum of $I_{BA1A3}$ (that is the median background intensity of the areas A1+A3 (see FIG. 3b and corresponding text in the description)) or $I_{BA2}$ (that is the median intensity background on the area A2 (see FIG. 3b and corresponding text in the description)) from step χ10.
2. Calculate the background intensity standard deviation, $I_{BSTD}$, background std, by calculating and selecting minimum of $I_{BSTDA1}$ and $I_{BSTDA3}$, where $I_{BSTDA1}$ is the intensity standard deviation of area A1, and $I_{BSTDA3}$ is the intensity standard deviation of area A3.
3. Set background noise, $I_B$, as the maximum value of $I_{BC}$ or $2*I_{BSTD}$.
4. Calculate normalised background noise, $I_{BN}$, as background noise, $I_B$, divided with an estimated substance intensity value using the Intensity median value of the image (the detection area), $I_{mv}$ $I_{BN}=I_B/I_{mv}.$ 5. Modify C according to $C_{Mod3}=C*(1-(0.3*I_{BN})).$ The C of this algorithm, $C_{Mod3}$, indicates how much the data of a stored image depends on a problem or defect defined as random noise (see FIG. 10).

A skilled person realise that the coefficients in the different formulas in the examples above are only to be considered as example, not limiting the scope of the invention, and may be set within a suitable range of values.

Setting Confidence Value

Therefore, when analysing the image data, several cases of disturbances may be handled. Therefore, the method according to one embodiment of the invention further involves a step of determining by means of the data information of a stored image, as described earlier in this description, a confidence value that is related to a detected problem or a certain defect of an image. A number of different confidence calculations may be executed to be able to detect the kind of problem/defect and the amount of disturbance caused by one detected problem/defect of or a combination of detected problems/defects.

The kind of problem/defect that may occur depend on different conditions; for instance, if the reaction microchamber/microcavity comprises a solid phase, or comprises a solution, typically homogeneous, from which said data information has been acquired If the reaction microchamber comprises a solid phase from which said data information has been acquired, said solid phase, for instance being
 a) part of a wall of the reaction microchamber or
 b) a porous bed, such as a porous monolithic plug or a packed bed of porous or non-porous particles; or
 c) suspended particles; and in that the data processing step further involves a step of:

Setting a confidence value C in relation to the detected amount of disturbance of any of or a combination of the following problems and defects:
 Dry bed;
 Poor calibration of a search area in angle direction;
 Poor calibration of a search area in radius direction;
 Noise peaks;
 Hole in bed;
 Electronic saturated signals;
 Poor wash;
 Poor capturing of antibody;
 Chemical saturated signal;
 Random noise.

If the reaction microchamber comprises a solution, typically homogeneous, from which said data information has been acquired; the data processing step further involves a step of:

Setting a confidence value C in relation to the detected amount of disturbance of any of or a combination of the following problems and defects:
 Poor calibration of a search area in angle direction;
 Poor calibration of a search area in radius direction;
 Uneven signal distribution;
 Electronic saturated signals;
 Random noise.

Following figures describes all known disturbances to handle. The black dots are disturbances. Start of particle bed is the first particles viewed from the inner part of the CD. End of particle bed is the first particles viewed from the outer part of the CD.

Figure 4:
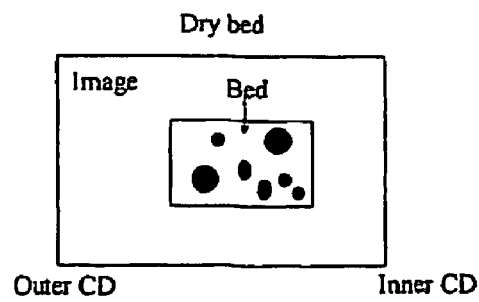
FIGS. 4-10 illustrates examples of different signal distributions in images corresponding to the search area of a particle bed.

FIG. 4: The image of a dry bed is characterised by small groups of pixels with very high intensity (black in the figure) and between them pixels with very low intensity (white in the figure). The very high intensity pixels should be located inside the particle bed area. The particle bed area should normally have higher intensity than the background in the image.

Figure 5:
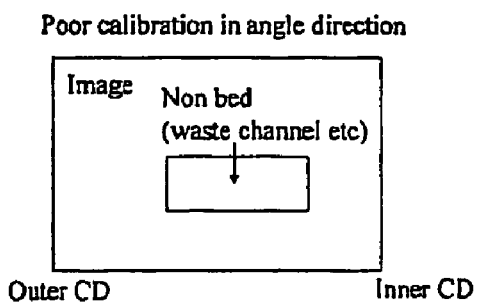

FIG. 5: Poor calibration in angle direction is characterised by no existing objects with higher intensity than background that has the expected structure width. Or the objects are located in one of the angular direction edges in the image. This should be identical for almost all images on one CD.

Figure 6:
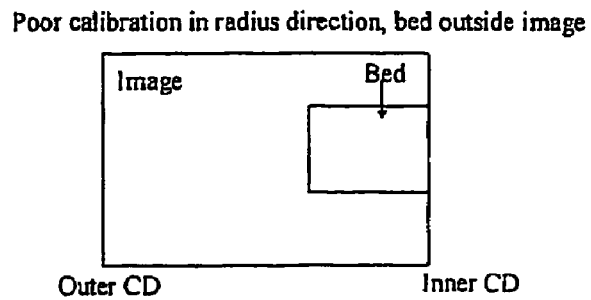

FIG. 6: For poor calibration in radius direction the particle bed is located at the outer CD or inner CD edges of the image. This should be identical for almost all images on one CD.

Figure 7:
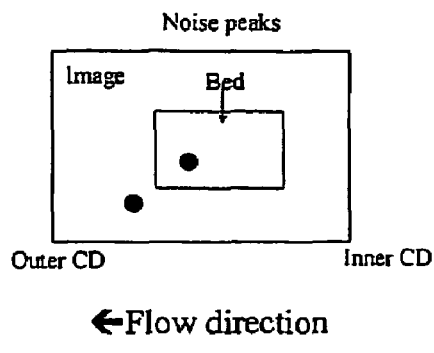

FIG. 7: Noise peaks is characterised by very high intensity (often the highest in the image) peaks normally with small pixel area. Dust and chemical artefacts can create noise peaks.

Figure 8:
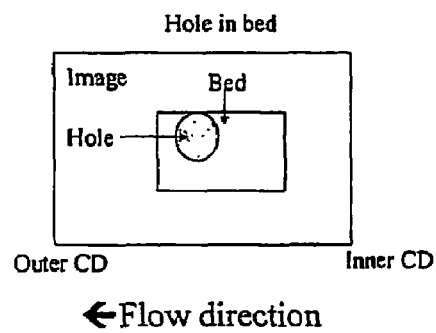

FIG. 8: An image of a hole in the bed is characterised by a relative large area inside the particle bed that has an intensity level close to the background outside the particle bed.

FIG. 9: In an image having electronic saturated intensity signal, one or several pixels identical to the largest possible value from the electronics (black area in image).

Figure 10:
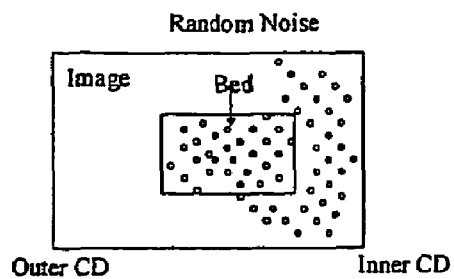

FIG. 10: The random noise problem of an image is characterised by lack of any significant signal with structure width and normal particle bed length.

Following figures are showing summation-graphs which are calculated by summarizing the radiation intensities in the image in y-direction (angular direction on a spinning disc) from one of the limits (or borders) of the image. For each border pixel (pixel on the border) the intensities of all the pixels laying on the same horizontal line in the angular direction, including the pixel on the corresponding border, are summarized. The graph shows the variation of the angular-summarized intensity as a function of the radial direction.

Figure 11:
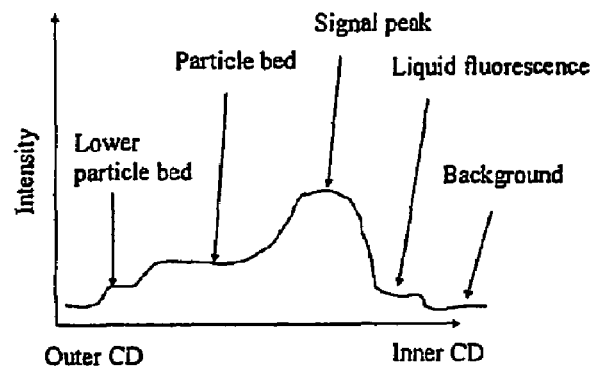
FIGS. 11-15 illustrates examples of the signal distribution in a search area in a two dimensional diagram.

FIG. 11: A fluorescence liquid is characterised by an even intensity level, higher than background, towards the inner part of the CD compared to the expected signal peak.

Figure 12:
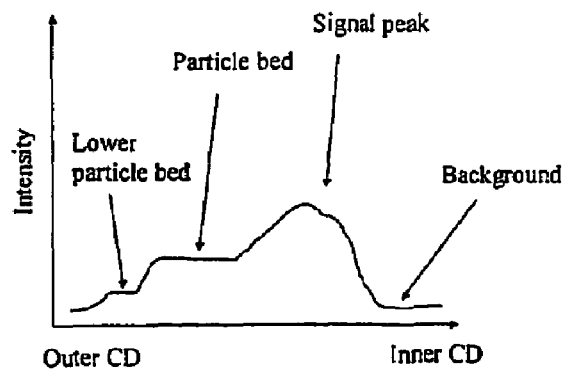

FIG. 12: A normal intensity signal distribution of an image is characterised by a large signal peak in the start of the particle bed. The peak falls of in a continuous way and ends with only the signal from the particle bed. It falls one more time to the lower particle bed and ends in the outer part of the image with the signal from the background only.

Figure 13:
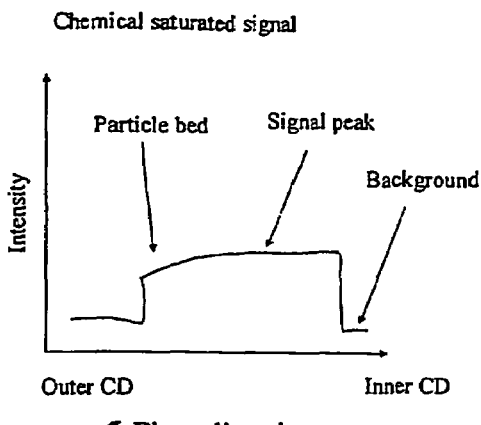

FIG. 13: Chemically saturated signal image characterised by high signal intensity, almost same level in a for a relative long distance, in the beginning of the particle bed and continuously decreasing intensity towards end of the particle bed and image.

Figure 14:
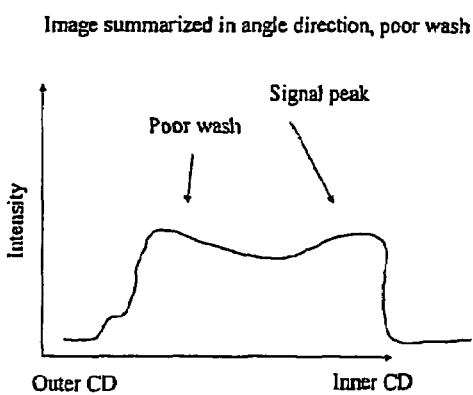

FIG. 14: The poor wash problem is characterised by an increased signal intensity in the image, towards the outer part of the column, after the expected signal peak. The increased signal drops off fast when the particle bed ends.

Figure 15:
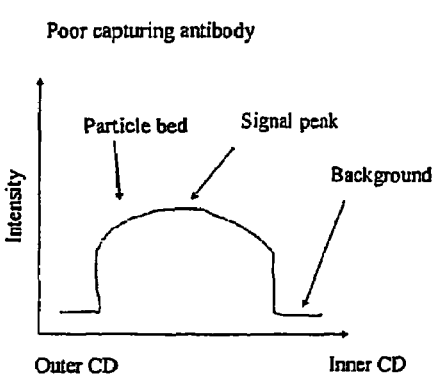

FIG. 15: Crosslinking of the capturing and detecting antibody in sandwich assay by human anti-mouse antibody (HAMA) present in the sample. The presence of HAMA antibody will exaggerate analyte contents of sample. It is characterised by a wide peak not located in the start of the image and relative high intensity in the end of the particle bed. Poor capture on the solid phase or unwanted binding of labelled reactant/reagent to the solid phase. Poor capture may be illustrated with a poor capturing reactant/reagent and/or that the flow rate through the reaction microchamber during the capturing step has been too high. Unwanted binding may be illustrated by undesired binding of sample reactants other than the analyte and subsequent binding of labelled reactant to such sample reactants. A typical example is sandwich assays utilizing capturing and labelled antibodies of the same species for assaying an analyte in a sample derived from an individual sensitized for this particular species (HAMA-antibody).

The present invention also relates to a system for determining a confidence value C from an analytic process performed in a microchannel structure of a microfluidic device, from which data information of the analytic process is acquired by scanning at least one search area of the microchannel structure for signal data, said search area comprising the result of the analytic process and said acquired data information is stored as an image, one image for each scanned search area, wherein the system further comprises means for data processing the acquired data information for determining the confidence value. Said system comprise a computer device and said means for data processing may be implemented as computer program software comprising computer program readable code for causing said computer device to perform the steps of the invented method.

The means for data processing further comprises means for determining the confidence value using the data information of the entire stored image or parts of the stored image.

The system may further comprise means for presenting the confidence value C. One embodiment of the invented system comprises means for presenting based on the confidence value if the result is acceptable or unacceptable.

Further, the system may comprise means for setting, by means of the data information of an image, a confidence value that is related to a detected problem or a certain defect of the image.

If the reaction microchamber comprises a solid phase from which said data information has been acquired, said solid phase being
 a) part of a wall of the reaction microchamber or
 b) a porous bed, such as a porous monolithic plug or a packed bed of porous or non-porous particles; or
 c) suspended particles; and in that the means for data processing further comprises means for setting a confidence value in relation to the detected amount of disturbance of any of or a combination of the following problems is detected:
 Dry bed;
 Poor calibration of a search area in angle direction;
 Poor calibration of a search area in radius direction;
 Noise peaks;
 Hole in bed;
 Electronic saturated signals;
 Poor wash;
 Poor capturing of antibody;
 Chemical saturated signal;
 Random noise.

If the reaction microchamber comprises a solution, typically homogeneous, from which said data information has been acquired; the means for data processing further comprises means for setting a confidence value in relation to the detected amount of disturbance of any of or a combination of the following problems is detected:
 Poor calibration of a search area in angle direction;
 Poor calibration of a search area in radius direction;
 Uneven signal distribution;
 Electronic saturated signals;
 Random noise.

In one embodiment of the invented system, the means for data processing comprises means for determining the confidence value for a search area from a graph which is a result of summarizing the signal data in one of the image directions. For instance, FIG. 11 illustrates a summation-graph which is calculated by summarizing the radiation intensities in the image in y-direction (angular direction on a spinning disc) from one of the limits (or borders) of the image. For each border pixel (pixel on the border) are the intensities of all the pixels laying on the same horizontal line in the angular direction, including the pixel on the corresponding border, summarized. The graph shows the variation of the angular-summarized intensity as a function of the radial direction.

The invention also relates to a computer program product for determining a confidence value from an analytic process performed in a microchannel structure of a microfluidic device, from which data information of the analytic process is acquired by scanning at least one search area of the microchannel structure for signal data, said search area comprising the result of the analytic process and said acquired data information is stored as an image, one image for each scanned search area, characterised in that the computer program product comprises a computer readable storage medium having computer readable program code embodied therein, the computer readable program code means comprising:

Computer readable program code means for performing each of the steps according to the invented method.

The computer readable storage medium may be any one of a record medium, hard disc, computer memory, read-only memory (ROM), programmable read-only memory (PROM), erasable programmable read-only memory (EPROM), flash memory, random access memory (RAM), removable data storage, or an electrical carrier signal. A removable data storage may be any one of floppy disc, ZIP @, CD (Compact Disc), flash memory or magnetic card or tape.

Methods for Determining Confidence Value by Use of Neural Network

In another embodiment of the preferred a Neural network is used for classification. As mentioned above, it is sometimes of certain interest to be able to classify if a substance raw data image is of high or low confidence. This can be achieved with a pre-trained multilayer perceptron neural network, which is described in the book "Neural computing, an introduction" by R Beale and T Jackson, published 1990 (ISBN 0-85274-262-2, IOP Publishing Ltd, Techno house, Redcliffe way, Bristol BS1 6NX UK) (hereafter "Beale et al."), see page 63. The multilayer network shall have one or two hidden layers (Beale et al., page 67). Application specialists classify the set of training and control data. The neural network is trained according to Beale et al., page 73. Inputs to the neural network use the calculation in following subtitles.

The present also invention relates to a neural network for determining a confidence value from an analytic process performed in a microchannel structure of a microfluidic device, from which data information of the analytic process is acquired by scanning at least one search area of the microchannel structure for signal data, said search area comprising the result of the analytic process and said acquired data information is stored as an image, one image for each scanned search area, wherein the system further comprises means for performing each of the steps of the invented method.

The output from the neural network is a value between 0 and 1 that correspond to the confidence.

As described earlier in this description, a number of different analysis and calculations may have to be executed to be able to detect the kind of problem/defect and the amount of disturbance caused by one detected problem/defect or a combination of detected problems/defects. In accordance with the invented method and system, to separate one defect from a number of other defects, a number of parameters is defined and calculated, wherein each of the specific or characteristic parameters are designed to capture a specific trait. Said parameters forms a set of image characteristics, a feature set. Said parameters, or feature set, after having been calculated, are input data to a classifier, which in one embodiment of the invention is a Neural network.

According to one aspect of the invention, at least one characteristic parameter value is determined and/or calculated using all or a part of the acquired data information for determining the confidence value (C).

According to another aspect of the invention, at least one characteristic parameter value is determined and/or calculated using all or a part of the acquired data information, and said at least one characteristic parameter value is used as input to a classifier for determining the confidence value (C).

According to further one aspect of the invention, at least one characteristic parameter value is determined and/or calculated using all or a part of the acquired data information, and said at least one characteristic parameter value is used as input to a classifier for determining the confidence value (C), wherein said classifier is a neural network.

The set of image characteristics from which the parameters have been designed are:
peak disturbances;
electronical saturation;
poor wash;
poor capturing antibody;
random noise;
smooth signal;
flow restriction;
disturbing signals deriving from material of microfluidic device.

For each item above an algorithm has been designed which calculates at which extent the image at hand consists of these characteristics. The algorithms are described in detail below.

Electronically Saturated Signal

According to one embodiment of the invention, the classification and confidence value can be determined by means of a parameter, $N_{pSN}$, calculated with an algorithm comprising steps 1 and 2 of example 1.

According to another embodiment, the classification and confidence value can be determined by means of a desired parameter that is calculated according to the following described algorithm. Images with signals having a maximum amplitude (100% or equal to one if normalized) are saturated. Depending on the degree of saturation, the image can be diagnosed as good, or is to be considered worthless.

The algorithm works as follows:

Within the detection area, the saturated pixel sum, which is the sum of pixels having an intensity that exceed for instance 95% of the maximum intensity, is determined. A saturated pixel quote is calculated by dividing the saturated pixel sum with the total number of pixels within the area. The saturated pixel rate r is given by multiplying said quote with 100. Finally, the calculated r is used as input in the sigmoid function giving the characteristic parameter:

$$P_{ESS} = \frac{1}{1 + e^{-k(r-5)}}$$

By setting k=10, a steep sigmoid is obtained which is zero for values of r up to almost 5, and unity (=1) for values slightly larger than 5.

Example:

If r=2%, that is less than the chosen 5% and the image is therefore relatively low saturated, the sigmoid function is zero and the image is regarded as acceptable. If r=10%, the image is regarded as heavily saturated, the result of the sigmoid function is unity, and the image is classified as useless by the neuron net.

Peak Disturbances and Noise Peaks

According to one embodiment of the invention, the classification and confidence value can be determined by means of a characteristic parameter, $SI_{PN}$, calculated with an algorithm comprising steps 1 and 4 of example 2.

According to another embodiment, the classification and confidence value can be determined by means of a desired parameter that is calculated according to the following described algorithm. To determine to which degree the image is contained by peak disturbances, there are many factors which are decisive. Amongst the most important is the size of the peaks, the location in the image and the total amount of peaks. The algorithm can therefore compress these different aspects into a single one, or treat each parameter as separate. There is however often problem to achieve pleasing results when combining all aspects into one single algorithm. In the following example, size of each peak and number of peaks are treated separately from the location parameter.

The following designed algorithm calculates the volume of the largest peaks, and relates it to the size, that is the total volume, of the signal.

The details of the algorithm are described in the following here below.

1. The locations of the peaks are specified beforehand by an existing peak detection algorithm, see example 2 above. Of all peaks detected, only peaks inside a detection area, for instance within the solid phase, e.g. particle bed or within a defied distance from the solid phase/detection area border, are considered. This distance may be defined in number of pixels, preferably 10 pixels or less.

2. Sort the peak intensity values from a predetermined area around pixel(s) having the highest intensity value(s) in descending order, and repeat the sorting procedure for each detected peak.

3. A threshold level is placed at the top of the highest peak, and lowered to the next pixel from the list in (2).

4. The image is thresholded at this level, and a binary image is obtained which is labeled. The area surrounding the peak-pixel is stored in a vector.

5. Steps (2) to (4) are repeated until there is a significant increase in the area surrounding the peak-pixel. The previous threshold level is selected and the volume of the peak is calculated.

6. As the final parameter-value, $P_{PD1}$, the peak-volume divided by the intensity volume in the entire detection area (=the sum of all pixel within the detection area) from (1) is used.

To increase efficiency further, and minimizing the use of labeling (which turned out to be a time-consuming task), the step size downwards (see step 3) is doubled as long as there is no significant increase in the area around the peak-pixel.

As a separated parameter, $P_{PD2}$, the largest peak's city-block distance from the front end of the particle bed is calculated.

Poor Wash

During the washing process of a solid phase, e.g. porous bed, associated with the detection area, the washing liquid may not successfully remove all unspecific bindings in the solid phase. The highest pixel intensities are concentrated in the end of the solid phase instead of, as for the perfect conditions, in the beginning of the solid phase, where the beginning of the solid phase is where the flow enters the solid phase. Said images are referred to as "poor wash"-images. The signal intensity volume in such images is characterized of a great backwards tilt and a "poor wash"-image can be identified by creating a binary image (each pixel is either zero, if the pixel is outside the signal intensity volume, or unity, if the pixel is located inside said volume) for each one of a number of different intensity threshold levels. To capture the tilt in a single parameter, the centre-of-mass for each binary image is calculated. Here follows an example of a suitable algorithm:

1. For getting appropriate threshold values, the lower quartile, mean and upper quartile intensity values of the signal intensity volume in the integration area 410 are evaluated.

2. A binary image of the signal intensity volume is created for each one of the chosen threshold intensity values.

3. A centre-of-mass coordinate is computed for each one of the binary images. The three binary images are located at different intensity levels over the zero intensity level of the integration area.

4. Fit a straight line by means of a least-square equation through the three centre of mass-coordinates of the binary images. The tilt coefficient of the straight line in the flow direction is used as the desired characteristic parameter, $P_{PW}$.

Poor Capturing Reactant, E.g. Antibody

If a capturing reactant immobilized to a solid phase that is associated with the detection area does not capture its counterpart sufficiently fast, the captured counterpart will be distributed evenly over the detection area/solid phase and not as in the ideal case only at the start of the detection area/solid phase. The raw image will be less trustworthy and should result in a low confidence. Images suffering from a poor capturing reactant, e.g. antibody, have a very evenly distributed signal over the entire detection area/solid phase, for instance particle bed, hence possessing a large volume. The desired parameter is calculated by integrating, or rather summing, the intensity values of all the pixels in the integration area 410 and by dividing the obtained value with the size of the integration area:

$$P_{PCC} = \frac{\int_{dA} \text{Intensity(int. area)} dA}{\text{size(int. area)}}$$

Random Noise

According to one embodiment of the invention, the classification and confidence value can be determined by means of a parameter, $I_{BN}$, calculated with an algorithm comprising steps 1 and 4 of example 3.

According to another embodiment, the classification and confidence value can be determined by means of a desired parameter that is calculated according to the following described algorithm. Poor quality images often suffer from lack of signal, and large amounts of noise spread evenly over the entire image. Generally speaking, the greater the variance outside the particle bed, the worse the quality. A similar approach as the calculation of the tilt-parameter is suggested here.

1. The entire raw image is thresholded at its upper quartile, and a binary image at this intensity level is created.

2. The perimeter of the binary image is computed, omitting the outer rim.

3. Finally, the desired characteristic parameter $P_{RN}$ is obtained by dividing the perimeter with the image size.

When computing the perimeter of the binary image, so called shot-noise will characterize random noise images. A pixel by itself results in four edges, whereas a large binary object posses many pixels inside without edges. Shot-noise images will lead to large values for the parameter, and images with a distinct signal have one counter only which produces a small perimeter.

Smooth Signal

The shape of the signal is a critical feature which belongs to the more difficult to capture in a few parameters. It is desirable to favour signals which are "well-shaped". In judging the shape of the signal volume, the most important property is the smoothness of the signal volume. The visual analysis suggests the shape to be close-to-quadratic for well-shaped signals. A signal profile along the angular direction is obtained by picking the maximum value of the signal a number of pixels into the integration area, and storing the profile in a vector. By using the signal profile along the angular direction and calculating the deviation from a fitted second order polynomial curve gives and indication of how smooth the signal is. The norm of the deviation is used as the characteristic parameter $P_{SS}$:

$$P_{SS} = \text{Quadratic error} = \frac{1}{N} \sqrt{\sum_{k=1}^{N} (y_k - p_k)^2}$$

y=The fitted second order polynomial.
p=The signal profile from the front.

Flow Restriction

A problem that can occur during the production of the microfluidic device, e.g. CD, is that the channels leading to a reaction microcavity, for instance containing a solid phase that may be in the form of a particle bed, are clogged with dust, particles or fibres, for instance. The resulting image has a very characteristic appearance with a bulge towards the inner radial direction. The algorithm designed utilizes small, pre-defined areas in the image.

Area C is a 5×5 pixel area centered between the borders of the integration area and with one of its sides coinciding with the image border at the inlet side. Area L is a 5×5 pixel area in the left corner of the image area at the inlet side and area R is a 5×5 pixel area in the right corner at the inlet side.

$$\text{Characteristic parameter is } P_{FR} = \frac{\text{mean}(C)}{\text{mean}(\min(L, R))}$$

Microfluidic Devices Made of Material Interfering with the Signal to be Measured.

Sometimes, regions outside a reaction/detection microcavity associated with the detection area may induce signals that are difficult to separate from the desired signal. The plastic material in a microfluidic device, for instance of the CD-type, may give rise to broad band fluorescence that may cause trouble if the desired signal is fluorescence. The approach chosen for this parameter is once again the threshold method. Since the prevalent areas in the image affected by this kind of undesired signal, such as fluorescence, are concentrated towards the bottom (in the flow direction) and side ends, this area has been separated by the procedure described below:

1. The desired signal area, for instance fluorescent area, is defined and separated by the threshold approach at the upper quartile of the integration area, resulting in a binary image.

2. The binary image obtained in step (1) is multiplied pixel wise with the original image (raw intensity image) at its upper quartile resulting in a "signal volume image".

3. The characteristic parameter, $P_{MD}$, is obtained by calculating the volume of the signal intensity of the image provided by step (2).

Above described algorithms generates parameters that is used in the invented method for determining a confidence value.

The different embodiments of the invented method for determining a confidence value from an analytic process in a microchannel structure of a microfluidic device may be implemented in a stand alone system (reference number 100 in FIG. 1), wherein said method comprises the step of:

running the analytic process;

acquiring data information of the analytic process by scanning at least one search area of the microchannel structure for signal data, said search area comprising the result of the analytic process and storing said acquired data information as a stored image, one image for each scanned search area;

characterised in that the method further comprises the step of:

data processing the acquired data information for determining the confidence value, and if desired, presenting the confidence value on a display device.

The invented method may be stored in/at and executed by the control unit (110 in FIG. 1) in the stand alone system.

The invented method may also be executed on a separate computer means/processing unit, which is not associated to or connected to a microfluidic instrument, system or device. The computer means or processing unit may be a specialised computer, server, Personal Computer, Digital Processor, Central Processing Unit, etc Certain innovative aspects of the invention are defined in more detail in the appending claims. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for determining at least one confidence value comprising:
    performing an analytical process by chemically reacting a biological or chemical sample with a reagent in a microchannel structure of a microfluidic device;
    scanning at least one search area of the microchannel structure for signal data from which data information of the result of the chemical reaction is acquired, said search area comprising a product of the chemical reaction;
    storing said acquired data information as one or more images, wherein one image is stored for each scanned search area; and
    data processing the acquired data information to calculate a confidence value indicating how close the scanned signal data is to what would be expected if the chemical reaction were undisturbed by defect.

2. The method according to claim 1, wherein the data processing step processes the signal data distribution in at least one of the stored images.

3. The method according to claim 1, further comprising:
    outputting the confidence value in a user perceivable format.

4. The method according to claim 3, wherein the method further comprises:
    determining based on the confidence value if the result of the analytical process is acceptable or un-acceptable; and
    outputting in a user perceivable format whether the result of the analytical process is acceptable or un-acceptable based on the determination.

5. The method according to claim 1, wherein the data processing step determines by means of the data information of an image a confidence value that is related to a detected problem or a certain defect of the image.

6. The method according to claim 5, wherein said at least one search area comprises a reaction microchamber from which said data information has been acquired.

7. The method according to claim 6,
    wherein the reaction microchamber holds a solid phase from which said data information has been acquired, said solid phase comprising at least one of:
    part of a wall of the reaction microchamber,
    a porous bed or a packed bed of porous or non-porous particles; and
    suspended particles, and
    wherein the data processing step further sets a confidence value in relation to the detected amount of disturbance of any of or a combination of the following detected problems:
    Dry bed;
    Poor calibration of a search area in angle direction;
    Poor calibration of a search area in radius direction;
    Noise peaks;
    Hole in bed;
    Electronic saturated signals;
    Poor wash;
    Poor capturing of antibody;
    Chemical saturated signal;
    Random noise.

8. The method according to claim 6,
    wherein the reaction microchamber holds a solution from which said data information has been acquired, and
    wherein the data processing step further sets a confidence value in relation to the detected amount of disturbance of any of or a combination of the following detected problems:
    Poor calibration of a search area in angle direction;
    Poor calibration of a search area in radius direction;
    uneven signal distribution; and
    Electronic saturated signals.

9. The method according to claim 4, wherein the data processing step determines the confidence value for a search area from a graph which is a result of summarizing the signal data in one of the image directions.

10. The method according to claim 1, wherein the data processing step is performed by use of a neural network, wherein the stored data information is input data to the neural network.

11. A system for determining at least one confidence value comprising:
    a microfluidic device comprising a microchannel structure, wherein an analytical process is performed by chemically reacting a biological or chemical sample with a reagent in the microchannel structure of the microfluidic device,
    means for scanning at least one search area of the microchannel structure for signal data from which data information of the result of the chemical reaction is acquired, said search area comprising a product of the result of the chemical reaction, said acquired data information being stored as one or more images, wherein one image is stored for each scanned search area; and means for data processing the acquired data information to calculate a confidence value indicating how close the scanned signal data is to what would be expected if the chemical reaction were undisturbed by defect.

12. The system according to claim 11, wherein the means for data processing determines the confidence value by processing the signal data distribution in the image.

13. The system according to claim 11, wherein the system outputs the confidence value in a user perceivable format.

14. The system according to claim 13, wherein the system determines if the result of the analytical process is acceptable or un-acceptable based on the confidence value, and outputs in a user perceivable format whether the result of the analytical process is acceptable or un-acceptable based on the determination.

15. The system according to claim 11, wherein the means for data processing determines based on the data information of an image a confidence value that is related to a detected problem or a certain defect of the image.

16. The system according to claim 15, wherein said microchannel structure comprises a reaction microchamber from which said data information has been acquired.

17. The system according to claim 16,
wherein the reaction microchamber holds a solid phase from which said data information has been acquired, said solid phase comprising at least one of:
part of a wall of the reaction microchamber;
a porous bed or a packed bed of porous or non-porous particles; and
suspended particles; and
wherein the means for data processing sets a confidence value in relation to the detected amount of disturbance of any of or a combination of the following detected problems:
Dry bed;
Poor calibration of a search area in angle direction;
Poor calibration of a search area in radius direction;
Noise peaks;
Hole in bed;
Electronic saturated signals;
Poor wash;
Poor capturing of antibody;
Chemical saturated signal;
Random noise.

18. The system according to claim 16,
wherein the reaction microchamber holds a solution from which said data information has been acquired, and
wherein the means for data processing sets a confidence value in relation to the detected amount of disturbance of any of or a combination of the following detected problems:
Poor calibration of a search area in angle direction;
Poor calibration of a search area in radius direction;
Uneven signal distribution;
Electronic saturated signals.

19. The system according to claim 14, wherein the means for data processing determines the confidence value for a search area from a graph which is a result of summarizing the signal data in one of the image directions.

20. The system according to claim 11, wherein the system comprises a neural network, wherein the stored data information is input data to the neural network.

21. A computer readable storage device on which is stored a computer program executable by a computer for determining at least one confidence value, the computer program comprising computer executable instructions for:
controlling a microfluidic device to perform an analytical process by chemically reacting a biological or chemical sample with a reagent in a microchannel structure of the microfluidic device;
controlling a detector to scan at least one search area of the microchannel structure for signal data from which data information of the result of the chemical reaction is acquired, said search area comprising a product of the result of the chemical reaction;
storing said acquired data information as one or more images, wherein one image is stored for each scanned search area; and
data processing the acquired data information in an image to calculate a confidence value indicating how close the scanned signal data is to what would be expected if the chemical reaction were undisturbed by defect.

22. The computer readable storage device according to claim 21, wherein the computer executable instructions for data processing processes the signal data distribution in at least one of the stored images.

23. The computer readable storage device according to claim 21, wherein the computer program further comprises:
computer executable instructions for outputting the confidence value.

24. The computer readable storage device according to claim 23, wherein the computer program code further comprises:
computer executable instructions for determining if the result of the analytical process is acceptable or un-acceptable based on the confidence value; and
outputting in a user perceivable format whether the result of the analytical process is acceptable or un-acceptable based on the determination.

25. The computer readable storage device according to claim 21, wherein the computer executable instructions for data processing sets by means of the data information of an image a confidence value that is related to a detected problem or a certain defect of the image.

26. The computer readable storage device according to claim 25, wherein said at least one search area comprises a reaction microchamber from which said data information has been acquired.

27. The computer readable storage device according to claim 26,
wherein the reaction microchamber holds a solid phase from which said data information has been acquired, said solid phase comprising at least one of
part of a wall of the reaction microchamber;
a porous bed or a packed bed of porous or non-porous particles; and
suspended particles, and
wherein the computer executable instructions for data processing sets a confidence value in relation to the detected amount of disturbance of any of or a combination of two or more of the following detected problems:
Dry bed;
Poor calibration of a search area in angle direction;
Poor calibration of a search area in radius direction;
Uneven signal distribution;
Hole in bed;
Electronic saturated signals;
Poor wash;
Poor capturing of antibody;
Chemical saturated signal;
Random noise.

28. The computer readable storage device according to claim 26,
   wherein the reaction microchamber holds a solution from which said data information has been acquired
   wherein the computer executable instructions for data processing sets a confidence value in relation to the detected amount of disturbance of any of or a combination of two or more of the following detected problems:
   Poor calibration of a search area in angle direction;
   Poor calibration of a search area in radius direction;
   Noise peaks; and
   Electronic saturated signals.

29. The computer readable storage device according to claim 24, wherein the computer executable instructions for data processing determines the confidence value for a search area from a graph which is a result of summarizing the signal data in one of the image directions.

30. The computer readable storage device according to claim 21, wherein the computer executable instructions for data processing uses a neural network, whereby the image data information is input data for the neural network.

31. The system according to claim 11, wherein the means for performing data processing comprises a neural network.

32. The system according to claim 31, wherein the neural network is a pre-trained multilayer perceptron neural network.

33. The method of claim 1, further comprising outputting in a user perceivable format an analysis of the result of the analytical process, and the confidence value.

34. The system of claim 11, wherein the system outputs in a user perceivable format an analysis of the result of the analytical process, and the confidence value.

35. The computer readable storage medium of claim 21, wherein the computer program code further comprises computer executable instructions for outputting in a user perceivable format at least one of: an analysis of the result of the analytical process, and the confidence value.

* * * * *